April 9, 1968 S. M. MacNEILLE 3,377,118
OPTICAL STRAIN-PATTERN SUPPRESSORS FOR HIGH-ALTITUDE
AIRCRAFT WINDSHIELDS Filed Feb. 2, 1962 3 Sheets-Sheet 1

INVENTOR.
Stephen M. MacNeille
BY
Blair and Buckles
ATTORNEYS.

INVENTOR
Stephen M. MacNeille

BY
Blair and Buckles
ATTORNEYS.

INVENTOR
Stephen M. MacNeille

BY Blair and Buckles
ATTORNEYS.

United States Patent Office 3,377,118
Patented Apr. 9, 1968

3,377,118
OPTICAL STRAIN-PATTERN SUPPRESSORS FOR HIGH-ALTITUDE AIRCRAFT WINDSHIELDS
Stephen M. MacNeille, Thompson, Conn., assignor, by mesne assignments, to American Optical Company, Southbridge, Mass., a corporation of Delaware
Filed Feb. 2, 1962, Ser. No. 170,675
3 Claims. (Cl. 350—157)

This invention relates to compensating systems for counteracting and suppressing confusing strain-patterns visible in transparent objects, and particularly to pattern suppressors for use in viewing ports and windshields in aircraft and like vehicles.

Pilots of high altitude aircraft have frequently reported confusing dark patterns observable in this aircraft windshields during flight. These cloudy, splotchy patterns are both confusing and dangerous, for the closing speeds of high altitude aircraft require maximum forward visibility from their control cockpits during flight.

Most such windshield patterns are apparently caused by polarization effects, in which partially polarized sky illumination coacts with residual strain patterns in heavy glass windshields of high speed aircraft, which may produce visible patterns similar to photoelastic stress patterns or other erroneous sight disturbances. These patterns may be made visible by a partial "analyzing" effect produced by emergent polarization at the glass-air interfaces of transparent windshield plates, and the visibility of such patterns may be increased by dual-plate windshields with additional glass-air interfaces.

The factors producing such visible strain-patterns are subject to wide variation. For example, the incident light may arrive at the windshield over a wide range of angles of incidence, and it may be partially polarized to a greater or lesser extent over a wide range of azimuths of the incident polarization plane. Compensator assemblies or strain-pattern suppressors must therefore be capable of effective operation over a wide range of different circumstances.

Accordingly, it is a principal object of the present invention to provide optical strain pattern suppressors for transparent objects which are capable of minimizing or eliminating visible residual strain patterns over a wide range of illumination conditions.

Another object of the invention is to provide strain-pattern suppressors of the above character of a compact convenient size.

A further object of the invention is to provide strain-pattern suppressors of the above character which are not subject to damage by abrasion, weather, dust, or foreign objects.

Another object of the invention is to provide strain-pattern suppressors of the above character suitable for installation in transparent vehicle wall members, such as aircraft windshields, windows, and the like.

A further object of the invention is to provide strain-pattern suppressors of the above character which are capable of adjustment for optimum compensating effectiveness.

Still another object of the present invention is to provide strain-pattern suppressors of the above character which are convenient and economical to manufacture and install.

Other objects of the invention will in part be obvious and will in part appear hereinafter.

The invention accordingly comprises the features of construction, combinations of elements, and arrangements of parts exemplified in the constructions hereinafter set forth, and the scope of the invention will be indicated in the claims.

For a fuller understanding of the nature and objects of the invention, reference should be had to the following detailed description taken in connection with the accompanying drawings, in which.

Investigation of the strain patterns observable in aircraft windshields has shown that pattern visibility depends upon the amount and azimuth of polarization of incident illumination from the sky. Such polarization may be as much as 50 percent complete at an altitude of 10,000 feet, and at such altitudes residual strain patterns in heavy glass aircraft windshields are often readily observable. These patterns are apparently caused by uneven cooling of the windshields during their manufacture, and such strain patterns produce some degree of double refraction or birefringence in the windshield. At the same time, the "analyzing" effect of the inner glass-air interfaces of the windshield elements may approach a maximum, because light often passes through such transparent windshield elements at angles closely approaching Brewster's angle. Furthermore, windshields for high altitude aircraft with pressurized cabins may have two heavy transparent plates forming a dual window and therefore producing in some measure the "analyzing" effect of a "pile-of-plates" polarizer.

These various factors often combine to produce dangerous and confusing cloudy patterns in the aircraft windshields, and polarizing sunglasses worn by the observer make such patterns even more noticeable and annoying.

For these reasons there is an important need for a reliable optical strain-pattern suppressor which is effective over a wide range of sky illumination conditions. The optical strain-pattern suppressors of the present invention are compact and economical. They are easily mounted or assembled in a single-plate or dual-plate windshield for high altitude aircraft, and they avoid the unnecessary expense of careful and time-consuming heat treatment of windshield glass plates to reduce residual strain therein and resulting adverse optical effects.

Figure 1:
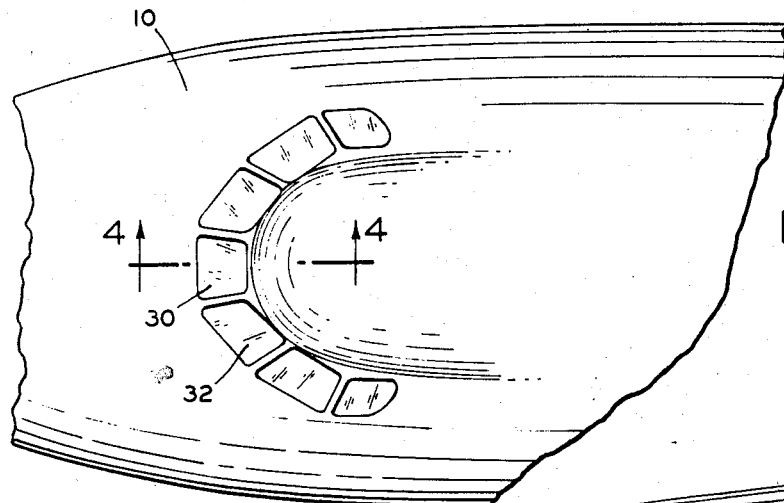
FIGURE 1 is a top plan view of an aircraft windshield forming an environment for the present invention.
Figure 2:
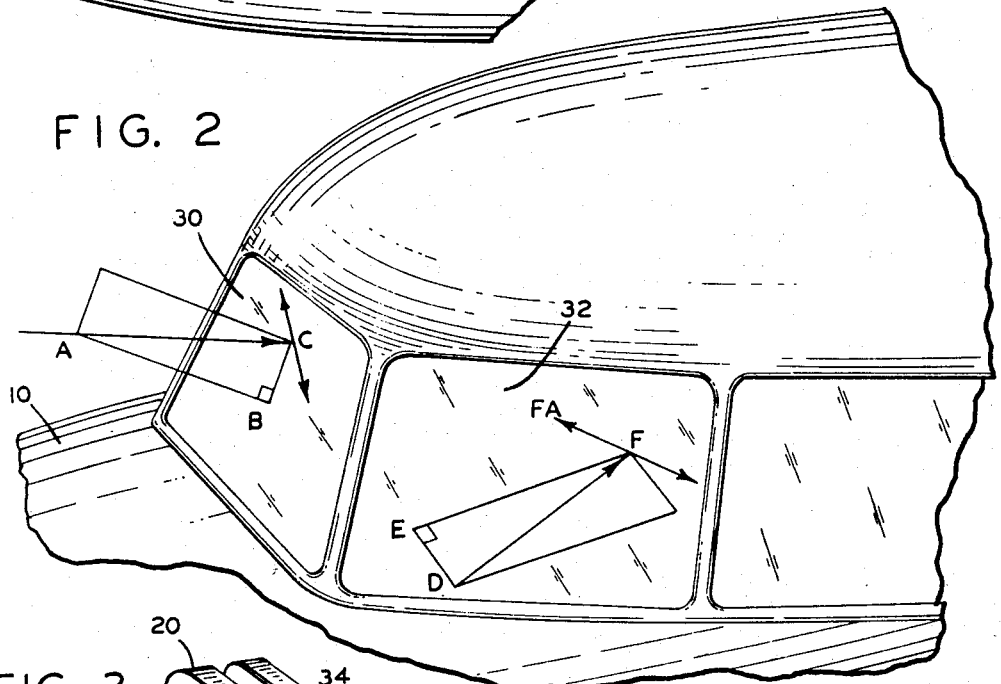
FIGURE 2 is a fragmentary perspective view of the windshield of FIGURE 1.

The control windshield panels of a high altitude airplane, the environment of the present invention, are shown in FIGURES 1 and 2. These windshield panels generally form the forward and lateral confining surfaces of a control cabin or cockpit positioned in the upper forward portion of the aircraft for maximum visibility in the direction of flight. Such windshields are formed of thick transparent glass or similar material sufficiently durable to withstand impacts of birds, hailstones, or other foreign objects, and to resist differential pressure loads produced by high altitude flight under cabin pressurization.

Figure 4:
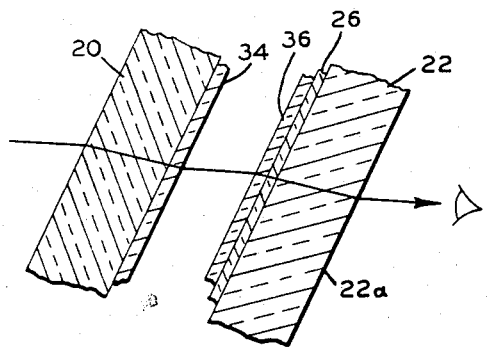
FIGURES 4 and 5 are enlarged fragmentary sectional side views of two forms of the "rotator" embodiment of the invention, taken along the line 4—4 in FIGURE 1.
Figure 5:
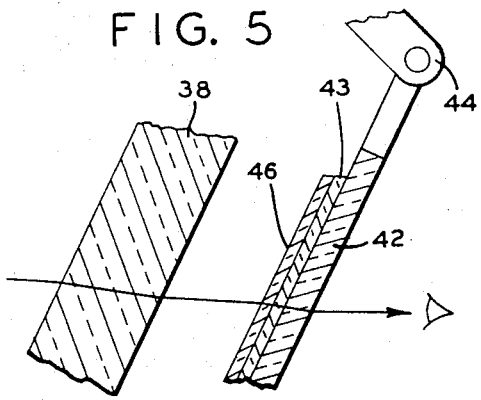

Two embodiments of the invention are shown in the cross-sectional views of FIGURES 4 and 5. FIGURE 4 shows a dual-window windshield panel having strain pattern suppressor optical elements incorporated on the facing inner surfaces of the two windshield units. FIGURE 5 shows a windshield formed as a single fixed transparent plate with a separate adjustable pull-down visor installed inside the aircraft near the inner surface of the transparent windshield plate. In the latter embodiment, the strain-pattern suppressor elements are positioned on the surfaces of the visor plate facing the windshield plate.

Figure 3:
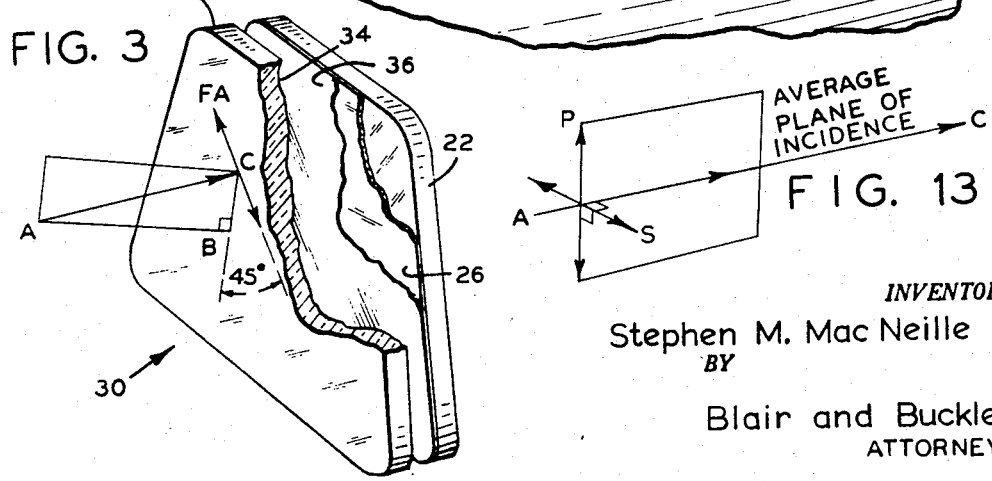
FIGURE 3 is a fragmentary perspective view of a dual-window panel from the windshield of FIGURES 1 and 2, incorporating one embodiment of the invention.

One form of the invention, shown in FIGURES 3 and 4, is used with a double windshield having two separate transparent plates 20 and 22. A partial "analyzing" effect is often produced by passage of light through these transparent plates along such paths as the line 24 in FIGURE 4, at an angle of incidence close to Brewster's angle, 57 degrees; because the ratio of light transmitted to light reflected at each interface is different for components polarized in different planes, partial polarization occurs at each interface, producing the effect of a polarization "analyzer" in much the same way that a pile of glass plates tilted at 57 degrees to the incident light will produce the polarizing effect of a Nicol prism or a plate of sheet polarizing material.

As recent investigations have shown, illumination from the clear sunlit sky is polarized to a substantial extent, and a definite plane or azimuth of maximum polarization can be noted by the observer. This phenomenon may be demonstrated by viewing a clear blue sky through a polarizer, such as a piece of sheet polarizing material, and noting the varying light intensity observed through the polarizer as it is slowly rotated. These intensity variations are negligible when viewing sky areas near the sun, and most noticeable with sky areas more remote from the sun.

The extent of sky polarization apparently increases at higher altitudes, and the plane (or azimuth for the horizontal) of maximum polarization of sky illumination varies, depending upon the portion of the sky being viewed and the relative position of the sun. Thus, as the heading of an aircraft changes during flight at high altitudes, polarization azimuth changes. For certain headings, the plane of maximum polarization of incident light will be substantially perpendicular to the polarization plane of the partial "analyzer" phenomenon observable through one or another of the windshield panels, such as the panels 30 and 32 in FIGURES 1 and 2. For other aircraft headings, the two polarization planes will be more nearly parallel.

Since residual strains are often produced during the cooling of the thick glass plates employed in aircraft windshields, the normal isotropic homogeneity of these plates is often destroyed, and areas which are anisotropic or birefringent to some extent are created in different portions of these plates. At particular areas of such a strained windshield plate, this birefringence may produce relative phase retardation of a half wavelength between perpendicularly plane polarized components of incident light of a central wavelength in the visible spectrum, and such areas of relative phase retardation produce clearly-visible "strain-patterns" when such a plate is interposed between two polarizing elements.

A high altitude aircraft windshield is interposed between two such polarizing elements when polarized sky illumination and windshield interface analyzing effects are considered. For half-wavelength retardation areas of the strained windshield plate, the incident polarization plane will be "rotated" about the principal axis of the birefringent strained windshield plate, and if the resulting "rotated" polarization plane is approximately perpendicular to the polarization plane of the windshield "analyzer" effect, this area of the windshield will appear dark to the observer, producing the effect of a "crossed analyzer" in blocking the transmission of incident polarized light.

Since carefully controlled cooling of these windshield plates would be time-consuming and expensive, there is an important need for a compensator which will eliminate these annoying and dangerous visible strain-patterns caused by this "crossed analyzer" effect.

The preferred combinations of this invention incorporate two types of optical elements designed to minimize this "crossed analyzer" effect. As seen in FIGURE 3, one of these is a polarization rotator 26 formed as a thin sheet, positioned on the forward surface of the inner windshield plate element 22. This rotator will normally take the form of a thin sheet of birefringent material selected to provide one-half wavelength relative phase retardation for perpendicularly polarized components of light of a wavelength near the center of the visible spectrum.

Since these birefringent materials transmit light polarized in one plane at greater velocities than perpendicularly plane polarized light, the projection of the incident polarization plane of maximum velocity transmission upon the incident face of the material may be called the "fast axis" of the material, and the perpendciular plane will define the "slow axis," and other "principal" axis of the material.

In the embodiment of FIGURES 3 and 4, one principal axis of this half-wave plate 26, such as the fast axis FA in FIGURES 2 and 3, is positioned at about 45 degrees to the "average" plane of incidence ABC of light passing through the windshield. The "average" plane of incidence of illumination viewed through a given windshield panel is determined by the "average" ray AC in FIGURES 2 and 3, entering the windshield panel 30 from the direction most often viewed through that panel by the observer inside the aircraft. The plane of incidence of the ray AC is defined by the line AC and its projection BC upon the panel 30, and light transmitted through panel 30 is partially polarized in this incident plane.

The polarization rotator 26 is positioned to minimize the "crossed analyzer" effect by rotating the polarization azimuth of illumination passing therethrough to allow separate analyzing effects occuring at successive glass-air interfaces to cancel each other. The effect of such a half-wave retardation element in "rotating" the incident plane of polarization is well known, and it is discussed at greater length in the copending application of Charles J. Koester, Ser. No. 802,366, filed Mar. 27, 1959, and issued Sept. 4, 1962, as U.S. Patent 3,052,152, and assigned to the assignee of the present invention. It has been found that orientation of the fast axis of rotator 26 at an angle of approximately 45 degrees to the average incident plane of sky illumination observed through the windshield panel results in the optimum compensating effects, eliminating the most harmful and dangerous visible strain patterns.

A windshield section or vision panel facing generally forward, such as the panel 30 in FIGURES 1, 2, and 3, will normally have its average plane of incidence vertical. Accordingly, the principal axis FA of the half-wave retardation element 26 in panel 30 would normally be oriented in the manner shown in FIGURE 2. Windows or vision panels installed in skewed planes, such as the corner windshield panel 32 (FIGURES 1 and 2) may be raked in a fore-and-aft direction and also in a sidewise or athwartships direction. Accordingly, the average ray DF of observed light may have a skewed incident plane DEF (FIGURE 2). After the "average" incident plane is selected as described above, the principal axis of the half-wave retardation element 26 is preferably oriented at an angle of about 45 dgrees with respect to this incident plane, to produce the optimum compensating effect, and the restultant azimuth of partial polarization produced at the rear surface of the first windshield plate 20 and the forward surface of plate 22 (FIGURE 4) is rotated about the fast axis FA, so that such effects may be reduced or eliminated by subsequent interface polarization effects, such as that produced at the rear surface of plate 22.

If the rotator 26 is a birefringent sheet selected to provide about one-half wavelength phase retardation for light of a central visible wavelength, it will have the effect of rotating the polarization azimuth of transmitted light of that wavelength to a symmetrical position on the opposite side of its fast axis FA. If that fast axis is oriented at about 45 degrees to the incident polarization azimuth then the resulting angular rotation will be about 90 degrees, substantially cancelling the "crossed analyzer" effect and virtually eliminating the extinction patterns observed through the windshield. Even for different incident polarization azimuths, substantial rotation will substantially reduce the "crossed analyzer" effect and other fast axis orientations between 30° and 60°, for example, will reduce the visibility of the strain paterns. For light of different wavelengths, the element 26 will produce substantial elliptical polarization, similarly reducing the "crossed analyzer" effect. The wavelength range of maximum effectiveness of the rotator 26 may be broadened by using achromatic rotators incorporating several phase-retarding elements, as disclosed in the copending application of Charles J. Koester, Ser. No. 752,479, filed Aug. 1, 1958, issued Oct. 30, 1962, as U.S. Patent 3,060,808, and assigned to the assignee of the present invention.

The preferred embodiments of the present invention also include other light-modifying elements which serve to reduce the "crossed analyzer" effect of the windshield assembly. In the embodiment of FIGURE 4, these are low reflection coatings 34 and 36 applied to the facing inner surfaces of the two windshield members 20 and 22. The coating 36 is applied directly over the rotator layer 26 on the inner face of the interior windshield member 22. These low reflection coatings, being applied to the interior facing surfaces of the dual windshield members and sealed within the assembled windshield, are not disturbed by weather or such foreign objects as dust or insects which may strike the windshield during flight, and they are similarly unaffected by cleaning either the outer surface of windshield member 20 or the inside surface of windshield member 22.

The "partial analyzing" effect occurring at each glass-air interface results in attenuation of the polarization component normal to the incident plane, relative to the component parallel to the incident plane. This relative attenuation might be expressed as a percentage, if the perpendicular component is relatively attenuated by 20%, for example.

The effect of the low reflection coatings 34 and 36 is to reduce these interface analyzing effects, at the exposed surfaces of the coatings, as compared with uncoated surfaces; thus the relative attenuation might be reduced from 20% to about 10%, for example. The rotator 26 will have the effect of interchanging the two components of transmitted light, since it has the effect of rotating each component by 90°, reversing the sign of the relative attenuation of the two components. Thus the interface analyzing effect could be +10% at each of the coatings 34 and 36, for a total of +20%, which becomes −20% after sign-reversal by rotator 26. If the uncoated rear surface 22a of plate 22 contributes another +20% analyzing effect, this effectively cancels the −20% combined rotated analyzing effects of the preceding surfaces, eliminating the analyzing effect of the windshield assembly as a whole.

The invention may be incorporated in aircraft having a single windshield plate 38 as shown in FIGURE 5 by mounting a half-wave retardation element or rotator 43 on a pull-down visor 42 suspended by suitable linkage 44 inside the aircraft cockpit adjacent the windshield 38. A layer 46 of a low reflection coating or a polarizing bilayer of several alternately high and low index materials may be positioned on the forward surface of the element 43 facing the inside of the windshield plate 38. The observer can then adjust the visor element 42, varying its orientation via linkage 44 to produce maximum effect. Such movable members as the visor element 42 need not be mounted on the cabin wall of the aircraft; for example, they may be mounted as part of the observer's headgear, goggles, sunglasses, or the like.

Figure 6:
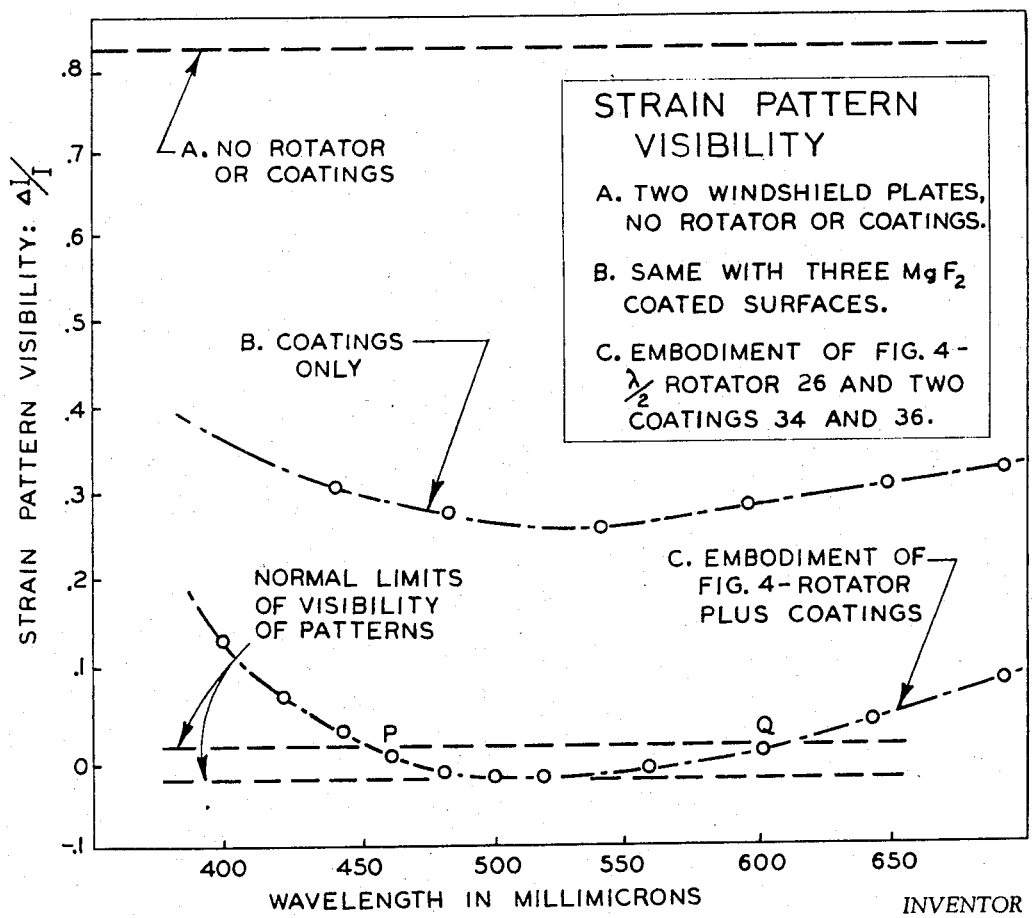
FIGURE 6 is a graph representing the effectiveness of the construction shown in FIGURE 4.

With the embodiment of the invention shown in FIGURE 4, the curves of FIGURE 6 show the striking effectiveness of the strain pattern suppression action of the combination. Over the visible spectrum for a 60-degree angle of incidence of the light passing through the windshield, the visibility of the worst possible strain-pattern seen with the embodiment of FIGURE 4 is nearly invisible as shown by curve C in FIGURE 6, most of which lies between the normal visibility limits where strain-patterns are not visible to most observers. Thus between the points P and Q, over the visible spectrum between 450 and 600 millimicrons, such patterns are substantially eliminated by the embodiment of FIGURE 4. In this graph, the "visibility" of the strain pattern is expressed as the ratio $\Delta I/I$, where $\Delta I$ is the difference in intensity between a point having 180° path differnce compared to a point having zero strain, and I is the light intensity observed at a point where there is no strain. With an ordinary dual windshield having no such coatings or layers on the rotator 26 as the low reflection coatings 34 and 36, a strain pattern of perhaps 10 times greater visibility may be observed, with $\Delta I/I=0.83$, as shown by curve A in FIGURE 6. Furthemore, the use of ordinary low-reflection coatings on the inner surfaces of such a dual windshield cannot match the effectiveness of the combination shown in FIGURE 4 in reducing the visibility of strain patterns, for such low reflection coatings alone will reduce pattern visibility only to the neighborhood of 0.28, for example as shown by curve B in FIGURE 6.

Thus FIGURE 6 illustrates the significant effectiveness of the strain-pattern suppressors of this invention. Where low-reflection coatings alone can reduce pattern visibility by only about 60%, curve C shows that substantially 100% compensation or elimination is achieved over a wide spectrum by the suppressors of this invention.

The preferred forms of this invention illustrated in the enlarged cross-sectional views of FIGURES 4 and 5 provide very effective suppression of such strain patterns throughout the visible spectrum. Similar effectiveness may be achieved with the "vectograph" embodiments of FIGURES 7, 8 and 9, wherein a sheet of partially polarizing material 50 is interposed in the line of sight between the observer 52 and the windshield 54. The partially polarizing material 50 is selected to provide a transmittance ratio between vertical and horizontal components of transmitted light which is the reciprocal of the average comparable transmittance ratio for the surfaces of the windshield 54 through which light passes after passing through the strained or birefringent region of the windshield.

Thus, if at the inner surface of windshield 54, the horizontally and vertically polarized components of transmitted light encounter transmittances of $T_H$ and $T_V$ respectively, then the comparable transmittances $T_H{}'$ and $T_V{}'$ of the partially polarizing sheet 50 are selected so that $$T_V{}'/T_H{}' = T_H/T_V$$

The "vertical" and "horizontal" directions may be taken as respectively parallel and perpendicular to the average incident plane for skewed windshield panels such as panel 32 shown in FIGURE 2.

The partial analyzing effect of the inner surface or surfaces of an aircraft windshield makes the undesired strain patterns visible only because of the unequal transmittance of the vertically and horizontally polarized components of observed light. If the observed difference between these respective transmittances is partially reduced or fully eliminated by interposing the partially polarizing sheet 50, the troublesome patterns are correspondingly reduced or eliminated with only a slight loss of total brightness often less than the loss from a pair of polarizing sunglasses.

Figure 7:
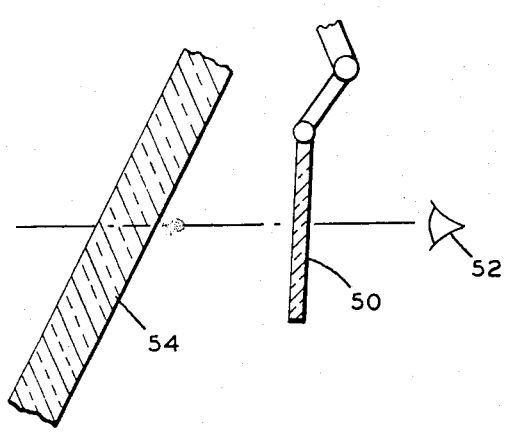
FIGURES 7, 8 and 9 are schematic side view diagrams of three forms of the "vectograph" embodiment of the invention.
Figure 8:
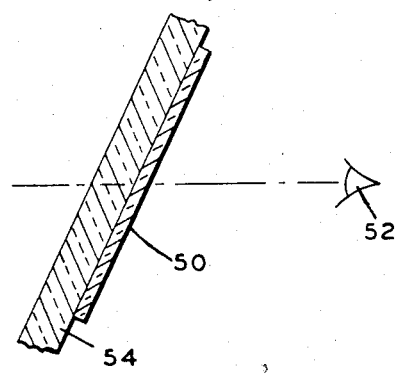
Figure 9:
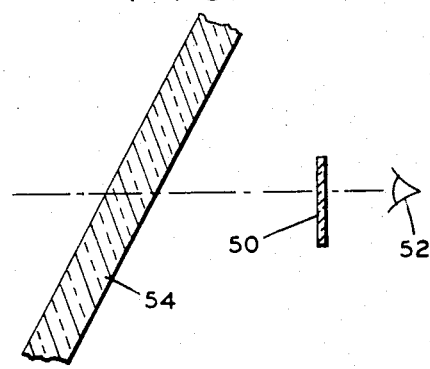

Adjustable visor mounting of sheet 50 is shown in FIGURE 7, mounting directly on the inner surface of the windshield is shown in FIGURE 8, and mounting in pilot's helmet or goggles is shown schematically in FIGURE 9.

Figure 10:
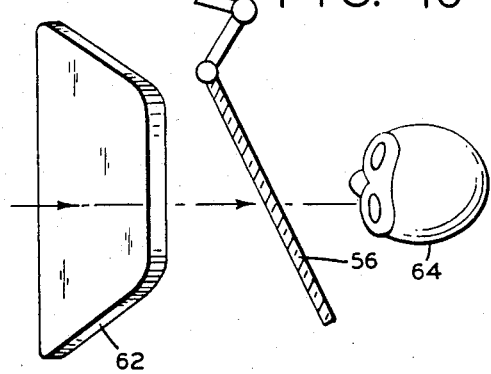
FIGURES 10, 11 and 12 are schematic top view diagrams of the "skewed plate" embodiment of the invention.
Figure 11:
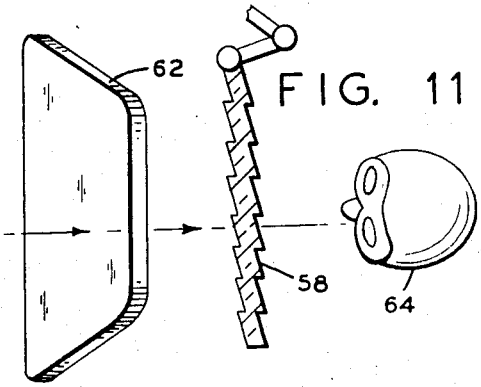
Figure 12:
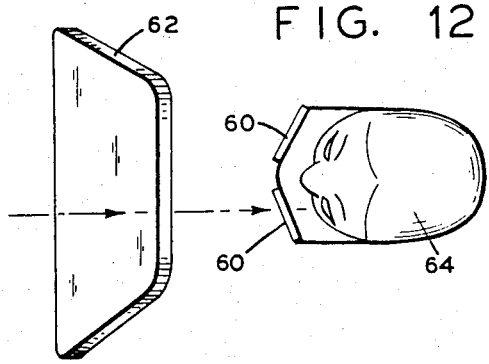

FIGURES 10, 11 and 12 illustrate three forms of a further embodiment of the invention in which a transparent plate is interposed at a skewed angle between the windshield 62 and the observer 64.

In FIGURE 10, the skewed plate 56 is oriented so that the plane of incidence defined by the incident light ray and its projection on the surface of plate 56 is at right angles to the original "average" plane of incidence on the glass air surfaces following the strained region of the windshield which introduced the undesired analyzing effect.

FIGURE 11 shows schematically a Fresnel-type plate having its entrance and exit surfaces oriented at the desired angle to produce this perpendicular plane of incidence. The skewed plate may be mounted as an adjustable visor, as shown in FIGURES 10 and 11, permitting adjustment by the observer for optimum pattern suppression, or the skewed plate elements may be incorporated in the pilot's helmet or goggles, as indicated in FIGURE 12. Furthermore, the suitably oriented Fresnel-type plate 58 of FIGURE 11 may be mounted at a suitable angle as a permanent part of a windshield assembly, if desired. The inclined surfaces of the plates 56, 58 or 60 may be uncoated, but vacuum coatings giving higher reflectance permits the use of lesser angles of incidence, and correspondingly less "skewing" of the plates.

In high-altitude aircraft windshields, the normal windshield glass-air interface polarization effect produces partial analyzing of transmitted light parallel to the average plane of incidence because of the "pile-of-plates" polarizing effect.

In each embodiment of the present invention, the partial plane polarization occurring at the inner surfaces of the windshield, producing the undesired "partial analyzing" effect, is counteracted by a substantially equal partial plane polarization in a direction perpendicular to the average incident plane. This is achieved by interposing a light-modifying element between the windshield and the observer which has a partial polarizing effect in a polarization plane normal to the average incident plane of the windshield.

Figure 13:
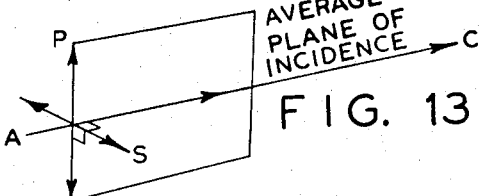
FIGURE 13 is a perspective schematic diagram showing the operation of the invention.

Transmitted light may be considered to have two components P and S, as shown in FIGURE 13, respectively plane-polarized parallel and perpendicular to the average incident plane ABC. The light leaving the strained region of the windshield passes through surfaces which may be said to have a transmittance ratio of R for the two components P and S, producing the undesired partial polarizing effect in a plane parallel to the average incident plane.

To reduce or eliminate this "partial analyzing" effect, the various embodiments of this invention incorporate a light-modifying element positioned between the windshield plate and the observer. This element preferably has an inverse transmittance ratio, 1/R, for the same perpendicular components P and S.

This may be achieved either by the partially polarizing or "vectograph" material of FIGURES 7, 8 and 9; by the skewed plate with its perpendicular plane of incidence of FIGURES 10, 11 and 12, or by the 90° rotator and subsequent further interface partial polarization of FIGURES 3, 4 and 5.

Thus, the undesirable visible strain patterns produced by sky-polarization and residual cooling strains in windshields may be conveniently and effectively reduced or eliminated with this invention.

In addition, the embodiments shown in FIGURES 4 and 8 are well suited for incorporation in the dual windshields often employed in the control cockpit windows of high-altitude aircraft having pressurized cabins. The present invention in both its fixed and adjustable forms is highly effective in suppressing or eliminating troublesome residual strain patterns otherwise observable in windows and vision ports of all types of high altitude vehicles capable of operation in the upper atmosphere.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. A strain-pattern suppressing window construction for use in high-altitude aircraft and the like, said construction for providing a maximum visibility substantially free from strain-patterns for a person looking outwardly through any part thereof and comprising in combination a relatively thick, plate-like member positioned as a window in a wall portion of said aircraft, said member being formed of a transparent material having relatively high light-transmitting characteristics and being so angularly positioned in said wall as to have its outer surface disposed at an angle very nearly equal to a Brewster's angle when considered relative to the plane of incidence of light rays travelling along a predetermined principal direction of viewing through said member, a compensator assembly comprising a second plate-like member formed of a transparent material likewise having relatively high light-transmitting characteristics, said second member being spaced inwardly of said first plate-like member and in such operative relation thereto as to have its outer surface disposed in adjacent spaced substantially parallel relation to the inner surface of said first plate-like member, and a birefringent half wavelength retardation layer of material positioned upon the outer surface of said second member and substantially covering same, said half wave layer being so oriented upon said second plate as to have its principal axis disposed at a 45° angle relative to the plane of incidence of light rays travelling along said principal direction of viewing and passing therethrough, whereby a one-half wavelength relative phase retardation having perpendicularly polarized components for said light waves will be provided said light rays before passing through said second plate, and, accordingly, any partial polarizing effect due to strain-pattern conditions of said first plate will be substantially eliminated.

2. The combination as defined in claim 1 including supporting means connected to said second member and a part of said aircraft for allowing movement of said second member from said operative to an inoperative position spaced therefrom.

3. The combination as defined in claim 1 wherein reflection reduction coatings are provided upon the inner surface of said first member and upon the outer surface of said birefringent layer adjacent thereto.

References Cited

UNITED STATES PATENTS

| | | | |
|---|---|---|---|
| 2,237,565 | 4/1941 | Land | 350—157 |
| 2,367,096 | 1/1945 | Chubb | 88—65 |
| 2,433,503 | 12/1947 | Young | 88—65 |
| 2,641,954 | 6/1953 | Scharf et al. | 350—164 |
| 2,750,833 | 1/1956 | Gross | 88—65 |

DAVID H. RUBIN, *Primary Examiner.*

J. H. PEDERSEN, *Examiner.*

P. R. MILLER, *Assistant Examiner.*